(12) United States Patent
Sternberg et al.

(10) Patent No.: US 10,926,171 B2
(45) Date of Patent: *Feb. 23, 2021

(54) METHOD OF AUTOMATING APPLICATION PROGRAM OPERATION IN A VISUAL DISPLAY ECOSYSTEM

(71) Applicant: IPPASA, LLC, Peoria, AZ (US)

(72) Inventors: Aaron B. Sternberg, Bellevue, WA (US); Craig S. Erickson, Roseville, CA (US)

(73) Assignee: IPPASA, LLC, Peoria, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/544,492

(22) Filed: Aug. 19, 2019

(65) Prior Publication Data

US 2019/0366209 A1 Dec. 5, 2019

Related U.S. Application Data

(63) Continuation of application No. 16/154,507, filed on Oct. 8, 2018, now Pat. No. 10,384,124, which is a (Continued)

(51) Int. Cl.
*A63F 13/40* (2014.01)
*A63F 13/822* (2014.01)
(Continued)

(52) U.S. Cl.
CPC ............ *A63F 13/40* (2014.09); *A63F 13/214* (2014.09); *A63F 13/2145* (2014.09);
(Continued)

(58) Field of Classification Search
CPC .......... A63F 13/20; A63F 13/25; A63F 13/31; A63F 13/40; A63F 13/60
See application file for complete search history.

(56) References Cited

U.S. PATENT DOCUMENTS

2007/0257101 A1  11/2007  Alderucci et al.
2008/0311971 A1  12/2008  Dean
(Continued)

FOREIGN PATENT DOCUMENTS

WO         2014135692 A1    9/2014

*Primary Examiner* — Omkar A Deodhar
(74) *Attorney, Agent, or Firm* — Stoei Rives LLP

(57) ABSTRACT

A method of automating application program operation in a visual display ecosystem is implemented with use of a smart device communicating with the visual display ecosystem through a short-range wireless bidirectional communication link. The method entails user creation of a display spatial data template in the visual display ecosystem and storage of the display spatial data template in the smart device located outside the visual display ecosystem. The user creates the display spatial data template in real time during application program operation by manipulating an input device connected to a command processing device on which the application program is operating. The user can retrieve the stored display spatial data template during application program operation at a later time. The system is advantageous in that the storage and retrieval of the display spatial data template makes minimal use of ecosystem resources, including processing power, bandwidth capacity, and display screen real estate.

9 Claims, 2 Drawing Sheets

Related U.S. Application Data continuation of application No. 15/557,375, filed as application No. PCT/US2016/043308 on Jul. 21, 2016, now Pat. No. 10,092,836.

(60) Provisional application No. 62/195,143, filed on Jul. 21, 2015.

(51) Int. Cl.
*A63F 13/323* (2014.01)
*A63F 13/214* (2014.01)
*A63F 13/2145* (2014.01)
*A63F 13/245* (2014.01)
*A63F 13/25* (2014.01)
*A63F 13/335* (2014.01)
*A63F 13/92* (2014.01)

(52) U.S. Cl.
CPC ............ *A63F 13/245* (2014.09); *A63F 13/25* (2014.09); *A63F 13/323* (2014.09); *A63F 13/335* (2014.09); *A63F 13/822* (2014.09); *A63F 13/92* (2014.09)

(56) References Cited

U.S. PATENT DOCUMENTS

| | | |
|---|---|---|
| 2013/0273998 A1 | 10/2013 | Froy, Jr. et al. |
| 2014/0181251 A1 | 6/2014 | Riegler et al. |
| 2014/0277627 A1 | 9/2014 | Bastawros |
| 2015/0087369 A1 | 3/2015 | Mcintyre et al. |

# METHOD OF AUTOMATING APPLICATION PROGRAM OPERATION IN A VISUAL DISPLAY ECOSYSTEM

RELATED APPLICATIONS

This is a continuation of U.S. patent application Ser. No. 16/154,507, filed Oct. 8, 2018, now U.S. Pat. No. 10,384,124, which is a continuation of U.S. patent application Ser. No. 15/557,375, filed Sep. 11, 2017, now U.S. Pat. No. 10,092,836, which is a 371 of International Application No. PCT/US2016/043308, filed Jul. 21, 2016, which claims benefit of U.S. Patent Application No. 62/195,143, filed Jul. 21, 2015.

COPYRIGHT NOTICE

©2019 IPPASA, LLC. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

This disclosure relates to manipulation, on a visual display, of images or symbols represented by a set of display spatial data generated in response to a set of commands produced by user actuation of input devices and, in particular, to a system for delivering to, storing in, and accessing from a smart device, a display spatial data template that represents a subset of the set of the display spatial data.

BACKGROUND INFORMATION

Manual controllers for manipulating images or symbols on a visual display of a computer device include, for example, joysticks, game pads, steering wheels, guns, mice, remote devices for television, stored multi-media display and recording machines, cellular telephones, portable video game systems, portable multi-media devices, tablets, and keyboards. One prevalent type of manual controller is a hand-held game controller, which comprises a control section having a plurality of buttons that the user presses to enter commands and hand grips that the user holds when the user operates the manual controller. The hand-held game controller is used for controlling video games. Some video games require a user to perform several input actions, such as button pushes, joystick movements, and trigger pulls, on a controller to achieve the desired outcome of a game on the display screen. Multiple repetitions of these actions can over time be tedious, time consuming, and susceptible to mistakes.

One way to reduce the number of game controller actions by a user is use of third-party programs. For example, in the case of the Minecraft™ building survival video game, a schematic file format has been created by users to store sections of a Minecraft™ game world for use with third-party programs, including MCElit, Minecraft™ Song Planner, Redstone Simulator, and WorldEdit. There are many websites that "host" schematics for upload and download.

The interest in schematics is two-fold. Individuals hosting Minecraft™ game servers can readily populate their Minecraft™ game worlds without taking the many hours of time necessary to build common structures to entire Minecraft™ game worlds. Regular users who want to add excitement to their Minecraft™ game worlds or do not possess sufficient creative skills to build such structures can enhance their game play experience by accessing schematics of structures built by other users. The regular users can then import and use in their Minecraft™ game worlds the building structures created by other users.

The problem with schematics is that importing a schematic file into a Minecraft™ world necessitates above-average user understanding as to how to install modifications to the Minecraft™ video game program. An incorrectly installed modification could break the installation of the Minecraft™ video game program. Moreover, such modifications are version specific, so that, for example, a schematic file written for a Minecraft™ version 1.4 program cannot be installed on a computer on which a Minecraft™ version 1.8 program is running.

To demonstrate the number and complexity of steps performed to import a schematic file, applicant presents as Appendix 1 the steps required for use of the WorldEdit program to import a schematic file. Appendix 1 makes abundantly clear that importing a schematic entails a lot of effort (i.e., more than 20 steps performed) by a user who possesses above-average knowledge of computing and technical aptitude to successfully complete a schematic installation.

The Minecraft™ game program built into the Minecraft™ PC offers a Clone command, which a user can actuate to carry out a multi-step process of copying and pasting the user's own building structures. The use of the Clone command also requires above-average knowledge of computing to successfully carry out the copy and paste process. For example, the Clone process entails extensive manipulation of structural block coordinates of source and destination regions. A capability for either importing a schematic or performing the Cloning method is available only on a computer, i.e., not on a console.

An added ability to automate the variety of hand-held game controller input actions that are sometimes necessary to achieve the desired output is the basis of preferred embodiments disclosed.

SUMMARY OF THE DISCLOSURE

In preferred embodiments, a hand-held game controller has, not only the typical standard input actuators, but additional input actuators that are dedicated for actuation by a user to select subsets of a set of hand-held game controller input actions performed during game play. The standard input actuators can, however, also be implemented to perform their conventional functions as well as specially defined functions corresponding to the stored subset of input actions. The hand-held game controller includes an integrated short-range wireless radio, which forms a wireless bidirectional communication interface for pairing connectivity with a smart device, such as a smartphone or tablet computer. The dedicated input actuators for user selection of subsets of hand-held game controller input actions and the integrated short-range wireless radio cooperate to enable sending and receiving of wireless data between the game controller and the smart device so that a user can efficiently and easily record for later retrieval from the smart device the subsets of hand-held game controller input actions.

A subset of hand-held game controller input actions produces a subset of display spatial data that define a display spatial data template. User-operable actuators located preferably on the smart device (but alternatively on the hand-held game controller) produce signals representing display spatial data marking commands that identify the display spatial data defining the display spatial data template. Thus, a user can, outside the video game play ecosystem, store for later retrieval a display spatial data template representing display spatial data that can be retrieved from the smart device for later use during current game play, during another game play session, or by transmission to another game player for his or her use. The video game play ecosystem includes major system components without which the video game cannot be played.

For example, a user plays the Minecraft™ building survival video game on the Xbox™ One home video game console. One major object of the Minecraft™ game is to cause a character in the game to actually construct buildings or other objects by using and manipulating multiple blocks of materials. A user can play the Minecraft™ game in either a survival mode or a creative mode. The survival mode is a game mode in which a user gathers material from an inventory of resources such as, but not limited to, stone, dirt, or sand; builds structures and entities (i.e., objects); fends off hostile mobs; and endures other hazards. The creative mode is a game mode in which a user drags and drops pre-formed structure blocks and entities to develop an inventory from which such items can be taken to build a structure. The pre-formed structure blocks and entities are embedded in the Minecraft™ game program. The disclosed system operates in either the survival or creative mode.

To build a house, a user follows a sequence of hand-held game controller input actions, from using the left joystick to move the character, the right joystick to aim where the blocks should be placed, and the left trigger to place the blocks. Depending on the size of house, the task of building a house could take minutes to hours.

In this example, a user could manipulate the hand-held game controller with input actuators that double as dedicated input actuators to enable display of a spatial data template and enable the integrated short-range wireless radio to transmit for storage in memory on the smart device the actual subset of input actions triggered on the hand-held game controller to produce the display spatial data template needed to build the desired house. The display spatial data template represents, therefore, a blueprint of the building structure created. Once done, the user can then export back to the hand-held game controller the recorded display spatial data template stored on the smart device and assign the display spatial data template to one of the input actuators on the hand-held game controller for future use in accessing the display spatial data template from the smart device.

The disclosed system does not rely on the installation of any program modification, knowledge of any coordinate system, or an understanding of even rudimentary language of console commands needed to perform the Minecraft™ Clone function on a PC. The system does not rely on the Minecraft™ program and can function independent of the game. The system makes accessible to a user the "spirit" of the schematic or Cloning capability.

The disclosed system delivers to the smart device the game controller input actions as they are performed to form a blueprint of the building structure being created. The system uses the display screen, computing capability, and information storage resources of a smart device to record, aggregate, store, sort, tag, and export back to the controller the game controller input actions for replication of the blueprint of a structure in the building process performed in game play.

The disclosed system is advantageous in that the storage and retrieval of the display spatial data template makes minimal use of the ecosystem resources, including processing power, bandwidth capacity, and display screen real estate. The system automates the operation of input actuators without detracting from the game play experience. Moreover, successful operation of the disclosed system necessitates essentially no user learning processes and, therefore, facilitates faster pace, productive game play by a low-skilled user possessing less dexterity and creativity.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
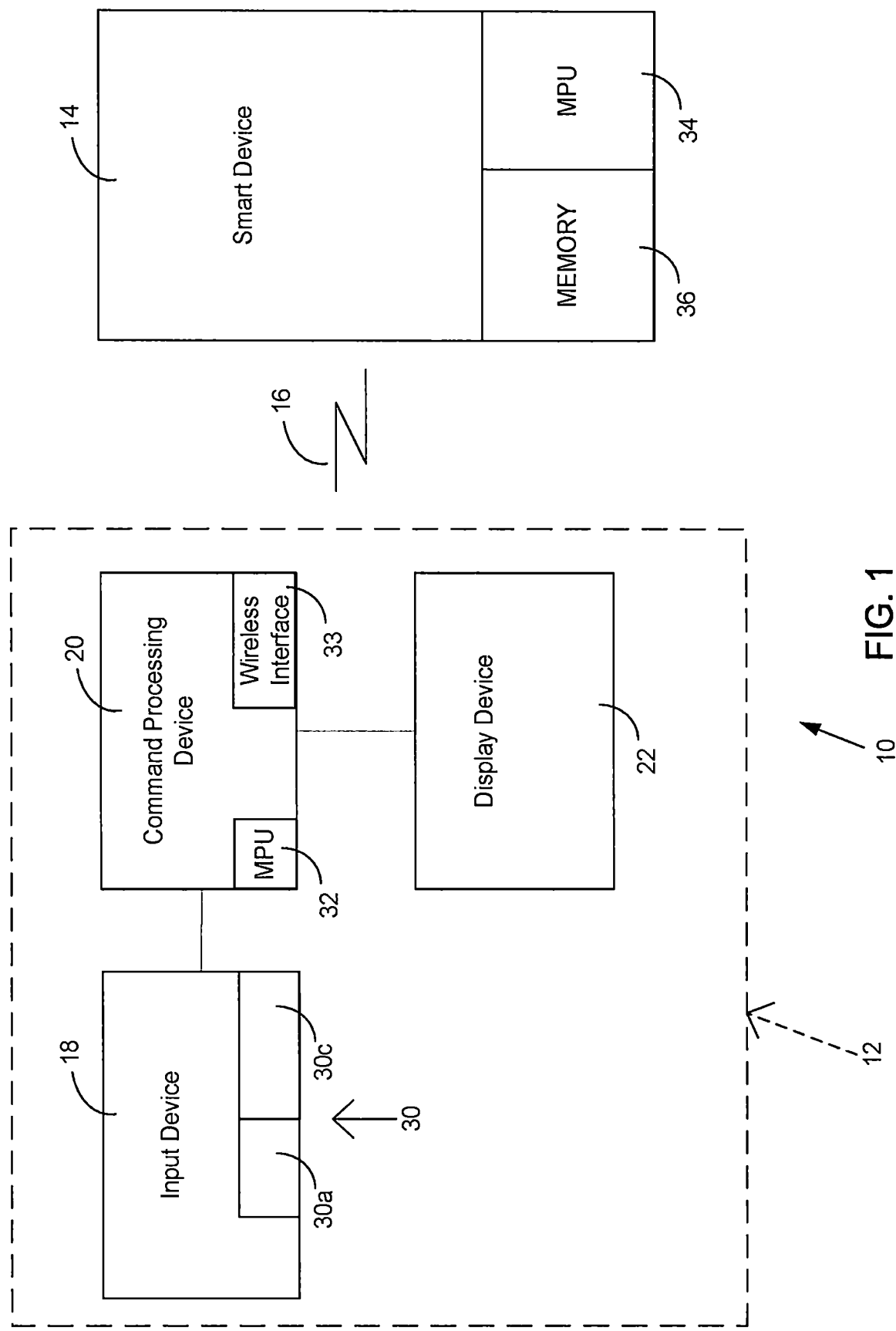
FIG. 1 is a block diagram showing a preferred embodiment of a system that enables user creation of a display spatial data template in a video game play ecosystem and storage of the display spatial data template in a smart device located outside the video game play ecosystem.

FIG. 1 is a block diagram showing, as a preferred embodiment, a system 10 that includes a video game play ecosystem 12 and a smart device 14 communicating with each other by operation of a communication signal interface establishing a short-range wireless bidirectional communication link through a communication medium 16. Although less preferred, there may be wired connections to smart device 14 outside video game play ecosystem 12. System 10 enables user creation of a display spatial data template in video game play ecosystem 12 and storage of the display spatial data template in smart device 14 located outside video game play ecosystem 12. The user creates the display spatial data template in real time during game play and can retrieve the stored display spatial data template during game play at a later time.

Video game play ecosystem 12 includes an input device 18 connected by wired or wireless transmission to a command processing device 20, to which a display device 22 is connected by wired or wireless transmission. Input device 18 is an on-the-fly, real time actuator. A preferred input device 18 is a hand-held video game controller having a set of input actuators 30, which include conventional input actuators 30c and additional actuators 30a that also function as multiple operation input actuators for retrieving a display spatial data template stored in smart device 14. Alternative input devices 18 include a gesture recognition device, an augmented reality device, a touchpad, a touch screen, an eye movement tracking device, a head motion sensing device, a virtual reality device, a joystick, a game pad, a steering wheel, a gun, or a mouse.

Command processing device 20 is implemented with a main microprocessing unit (MPU 32) on which a video game program operates and a short-range wireless bidirectional communication interface 33 to establish pairing connectivity between command processing device 20 and smart device 14. The video game program produces a set of display spatial data in response to a set of commands by user actuation of game play command input actuators in the set of input actuators 30. Display device 22 produces visual images corresponding to the set of display spatial data. A preferred command processing device 20 is a video game console. Alternative command processing devices 20 include a portable video game system, tablet, and personal computer. A notebook computer can perform the operations of command processing device 20 and display device 22.

Input actuators 30 include actuators that produce signals representing display data marking commands that identify display spatial data defining the display spatial data template. The display spatial data template represents a subset of the display spatial data produced in response to a corresponding subset of the set of commands generated by the user actuation of the game play command input actuators in the set of input actuators 30.

Smart device 14 includes a main MPU 34, on which a display spatial data template application program ("Template app") operates, and a memory 36, in which the display spatial data template created by the user is stored. Smart device 14 receives user-activated commands to store in or retrieve from memory 36 the display spatial data template received by smart device 14 through communication medium 16. Commands to store or retrieve the display spatial data template preferably given by user actuation of actuators on smart device 14, but may also be received through communication medium 16 from input device 18 or other source. The Template app manages the recording (i.e., storing), editing, and transmission to input actuators 30a of the subset of display spatial data. The transmission of the subset of display spatial data representing the template preferably actuates on smart device 14 a visual representation of input device 18 that allows the user to select the input actuator 30a that will perform the multiple functions for that template. The display spatial data template file exported from smart device 14 to video game play ecosystem 12 may be stored in memory located in controller 18 or command processing device 20.

Smart device 14 is an electronic device that can operate autonomously and interactively with other devices. A preferred smart device 14 is a smartphone. Alternative smart devices include a mobile phone; phablet; tablet; smart keychain; and wearables, including, for example, a smartwatch and a smart band.

Figure 2:
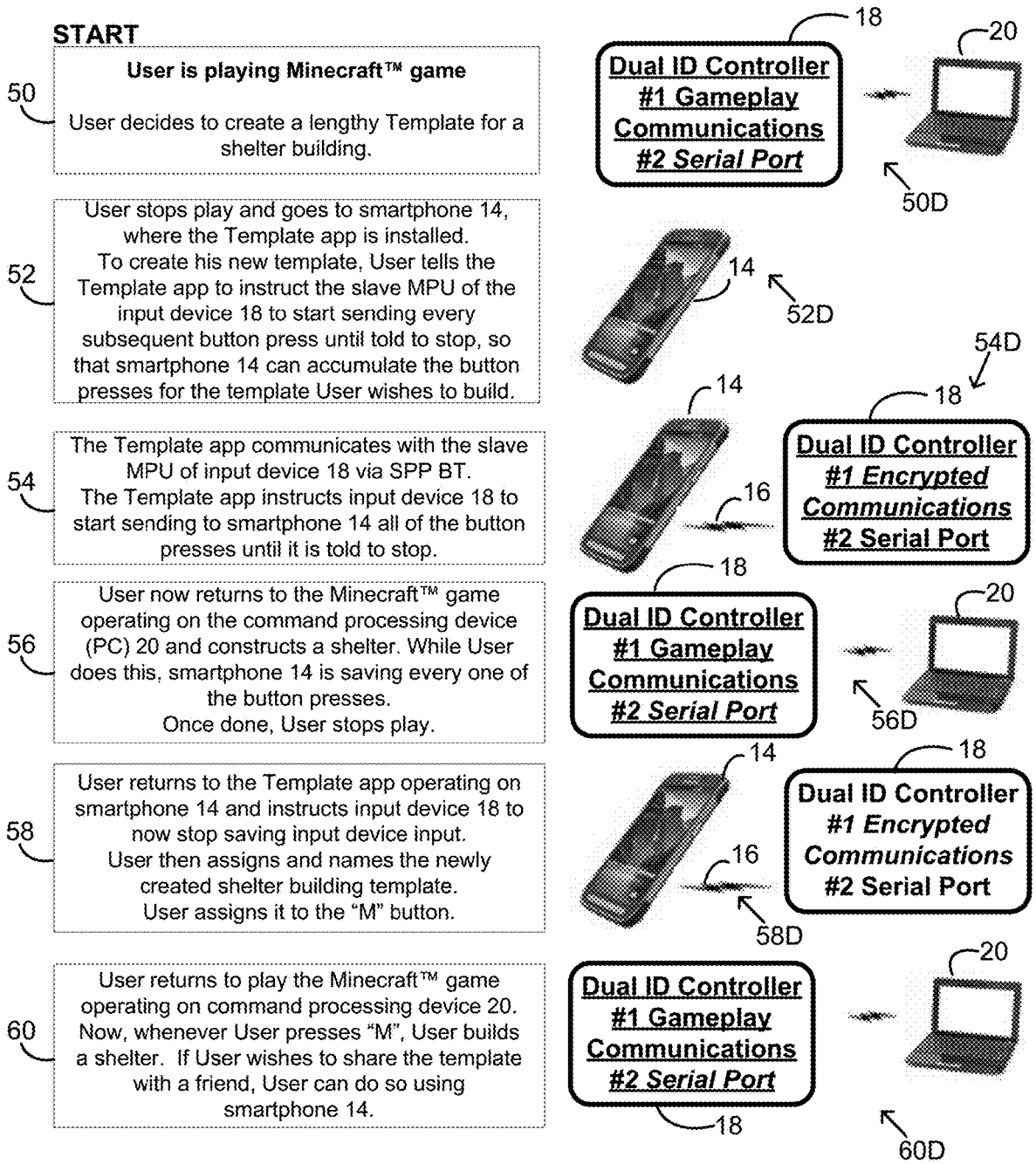
FIG. 2 is an annotated pictorial flowchart showing the process of storing in, and later accessing from, a smart device a display spatial data template derived from user actuation of game play command input actions.

FIG. 2 is an annotated pictorial flow chart showing, in an example of Minecraft™ building survival game play, the process of storing in and later accessing from smart device 14 a display spatial data template derived from input actions created by user actuation of game play command input actuators 30 on input device 18. The flow chart is arranged in two columns side-by-side. The left-side column presents process blocks describing creation and use of a building structure display spatial data template, and the right-side column shows pictorially the system components performing the actions during game play, as described by the associated process blocks. The input device 18 depicted in FIG. 2 is a dual ID controller that maintains the secure communication link with game processing device 20 as implemented by its manufacturer and by Bluetooth™ radio signal establishes a paired connection and effects all communications with smart device or smartphone 14. The communication link in use during each process step described is indicated in italics in FIG. 2.

With reference to FIG. 2, a game player named "User" is playing the Minecraft™ video game on a notebook or laptop computer 20. User powers up game controller 18 and decides to build a place of shelter as User searches new areas of the Minecraft™ map. User constructs a shelter and realizes that it would be of use at many different points in the game while User is searching across the map. (FIG. 2, process block 50 and diagram 50D.) User decides that, the next time User has to build a shelter, User is going to record the building process with controller 18 and smartphone 14.

User arrives at the next spot on the map User deems perfect for the shelter. User picks up smartphone 14, turns it on, and selects the Template app labeled "Template". (Prior to this point, User has already established paired connectivity between controller 18 with smartphone 14.) Once the Template app loads, a menu appears on the display screen of smartphone 14, with a record button prominently displayed in the middle of the Template app. (FIG. 2, process block 52 and diagram 52D.) User taps the record button, sets down smartphone 14, turns to controller 18, and starts to build the shelter. (FIG. 2, process block 54 and diagram 54D.) Upon finishing the shelter, User sets aside controller 18, picks up smartphone 14, and taps a stop recording button on the app. (FIG. 2, process block 56 and diagram 56D.)

The display spatial data template created during the recording represents a blueprint of the building structure, i.e., the shelter built. A window pops up on the display screen of smartphone 14 and asks User to name the recording. User decides to name the recording "Temp". Once User names the recording, another window pops up on the display screen of smartphone 14 and shows a picture of the controller 18 that is in use, with the buttons on controller 18 that are available to assign the new recorded template "Temp". User selects the "M" button, and then taps assign. (FIG. 2, process block 58 and diagram 58D.) User then puts down smartphone 14 and returns to controller 18. To test the template, User presses the "M" button on controller 18 to export to controller 18 the shelter blueprint represented by Temp, and a shelter is built by the Minecraft™ game program operating on laptop computer 20.

The export of blueprint template data to controller 18 could be accomplished as a live stream of Temp file data on demand in response to user activation of the "M" button for building the shelter, as a Temp file transfer for storage to the "M" button for building the shelter upon later user actuation of the "M" button on controller 18, or, in response to User actuation of a transmit command button on smartphone 14, as a pass through of shelter building instructions in real time from controller 18 to laptop computer 20. This last alternative is performed in lieu of actuation of a transmit command button on smartphone 14 to store shelter building instructions on controller 18.

The building materials used to construct the building structure represented by the TEMP data file can be accessed on the Minecraft™ Hot Bar.

User later decides to share with other people the Temp shelter User created. To do so, User picks up smartphone 14, loads the Template app, goes to Menu, under recordings selects User's recording, and then shares it with a third-party video game play ecosystem. (FIG. 2, process block 60 and diagram 60D.) User is able to share a specified recorded template because smart device 14 is configured to establish through a wireless Internet network protocol a wireless public template communication link with third-party wireless Internet protocol networks.

The next day User plays the Minecraft™ game on laptop computer 20 and decides to build in User's house a room perfectly configured for chests. User sets aside controller 18, picks up smartphone 14, loads the Template app, under Menu goes to the Public Template section, and searches for a chest room. The Public Template section represents a section of memory 36 in which templates uploaded by third parties are stored. User finds a chest room candidate and taps the download button to download the template called "Chest Room". Once the Chest Room template is downloaded, User selects a template naming button and choses the Assign option, which then displays a symbol representing User's controller 18. User then assigns the Template called "Chest Room" to the "P" button on controller 18.

System 10 can be configured so that, after establishing a paired connection between smart device 14 and controller 18, a third party-provided building structure template can be streamed direct to command processing device 20 without storage in controller 18. System 10 can also be configured to effect direct download of a third party-provided building structure template to controller 18, after initiation by user actuation of the Template app operating on smart device 14. Therefore, the direct download of the third party-provided building structure template bypasses storage in memory 36 of smart device 14.

If User forgets which button on controller 18 is storing which template, User can open the Template app on smartphone 14 and under the Menu section choose "Show Controller," and it will show a symbol representing controller 18 with the current template assignment settings.

The following are three examples of use cases for the display of spatial data template.

A user playing the Minecraft™ game on a PC wants to populate the world with structures, landscape, and buildings to make it a more immersive experience. User does not have the technical expertise to carry out the schematic installation or Clone process and, therefore, wants access to other players' creative building structures. User need only find the build on the Template app and then assign that building structure to a button on the controller to make the building structure appear.

User is a working professional with a family and does not have the time necessary to build all the structures the user would like, so user accelerates the process by using building structure display spatial data templates.

User is in the middle of a survival mode and is under attack. The user, who does not function well under pressure during game play, needs to quickly build a shelter on the fly and uses a display spatial data template to continue beneficial game play.

It will be obvious to those having skill in the art that many changes may be made to the details of the above-described embodiments without departing from the underlying principles of the invention. The scope of the present invention should, therefore, be determined only by the following claims.

Appendix 1

The following are the steps for installing WorldEdit:
1. Visit http://wiki.sk89q.com/wiki/WorldEdit.
   a. This link is the starting point for figuring out how to install WorldEdit.
   b. Before installing, the user must decide on a "plug-in" that will allow WorldEdit to be installed. There are five choices, each of which comes with its own set of instructions to download first:
      i. Forge
      ii. Bukkit
      iii. Liteloader
      iv. Canary
      v. hMod.
   c. For purpose of this example, the "Forge" plug-in is selected.
   d. Click on the link Want it for single player? Get the Forge mod and follow these instructions: http://wiki.sk89q.com/wiki/WorldEdit/Installation/Forge
   e. But before installing Forge, the user first needs to install WorldEdit for Forge http://minecraft.curseforge.com/mc-mods225608-worldedit, which is on the page.
   f. Click on link at the right side of the page WorldEdit 6.1 (for MC 1.8.0) to ensure that it matches with the version of the Minecraft™ program that is in operation.
   g. Return to http://wiki.sk89q.com/wiki/WorldEdit/Installation/Forge and click on the http://files.minecraftforge.net/ installer link.
   h. Find the appropriate version and the appropriate Computer OS, and then download.
   i. Return to http://wiki.sk89q.com/wiki/WorldEdit/Installation/Forge
   j. On http://wiki.sk89q.com/wiki/WorldEdit/Installation.Forge, click on the LiteLoader installer link, which is an apparently recommended link.
   k. Return to http://wiki.sk89q.com/wiki/WorldEdit/Installation/Forge.
   l. Restart the Minecraft™ program launcher.
   m. At the bottom left of the launcher, choose the "Forge" profile.
   n. Click on "Edit Profile".
   o. Click on "Open Game Dir".
   p. Make a "mods" folder, if one does not exist.
   q. Copy into the mods folder the WorldEdit's .jar file, as well as WorldEdit CUI's .litemod.
   r. Close any dialogs and click on "Play" to launch the game with WorldEdit!
   s. Paste the .schematic file in the /plugins/worldedit/schematics/ folder on user's Minecraft™ server.
   t. Load the schematic file in the game, using the "//schem load mcedit filename" command, where "filename" is the file name without the .schematic extension.
   u. Now go where user wants to place the schematic and paste it with the "//paste" command.
   v. If the schematic is badly placed, user can cancel it with the "//undo" command.

The invention claimed is:

1. A method of automating application program operation in a visual display ecosystem in response to action by a user, the visual display ecosystem including an input device operatively connected to a command processing device and a display device operatively connected to the command processing device, the input device having a set of input actuators, the command processing device implemented with a command processing device main MPU on which an application program operates to produce a set of display spatial data in response to a set of commands produced by user actuation of input actuators in the set of input actuators, and the display device producing visual images corresponding to the set of display spatial data, the method comprising:
producing user-operable actuator signals representing display spatial data marking commands, the display spatial data marking commands identifying display spatial data defining a display spatial data template that is developed in response to action by a user during application program operation in the visual display ecosystem, the display spatial data template representing a subset of the set of display spatial data produced in response to a corresponding subset of the set of commands generated by the user actuation of the input actuators;

establishing with the visual display ecosystem a bidirectional communication link with a smart device located outside the visual display ecosystem and operating through a communication interface, the smart device including a smart device main MPU on which a display spatial data template application program operates, and including display spatial data template memory; and causing the smart device main MPU, in response to commands received by the smart device, to, in real time, store in the display spatial data template memory and retrieve from the display spatial data template memory the display spatial data template received by the smart device through the bidirectional communication link, and thereby make the stored display spatial data template accessible for subsequent retrieval by the user or another user for application program operation in the same or another visual display ecosystem.

2. The method of claim 1, in which the smart device includes a mobile phone, smartphone, phablet, tablet, smartwatch, smart band, smart keychain, or wearable.

3. The method of claim 1, in which the command processing device includes a video game console, portable video game system, notebook computer, tablet, or personal computer.

4. The method of claim 1, in which the input device includes a video game controller, a gesture recognition device, a hololens, a touchpad, a touch screen, an eye movement tracking device, a head motion sensing device, a joystick, a game pad, a steering wheel, a gun, or a mouse.

5. The method of claim 1, in which the producing of user-operable actuator signals representing display spatial data marking commands is carried out by a user-operable actuator that is not included in the set of input actuators.

6. The method of claim 1, in which the producing of user-operable actuator signals representing display spatial data marking commands is carried out by a user-operable actuator that is included in the set of input actuators and is configured to function as a multiple operation input actuator for retrieval of the display spatial data template received by the smart device.

7. The method of claim 1, in which the smart device is configured to establish through a wireless Internet network protocol a wireless public template communication link with the smart device, and further comprising causing the display spatial data template memory to store display spatial data templates created in third-party visual display ecosystems and received through the wireless public template communication link.

8. The method of claim 1, in which the smart device is configured to establish through a wireless Internet network protocol a wireless public template communication link with the smart device to transmit the display spatial data template to a third-party visual display ecosystem.

9. The method of claim 1, in which the smart device is configured to establish through a wireless Internet network protocol a wireless public template communication link with the smart device, and further comprising, upon user actuation of the display spatial data template application program, causing download of a third-party created display spatial data template in a third-party visual display ecosystem, the third-party created display spatial data template downloading to the visual display ecosystem without storage in the display spatial data template memory of the smart device.

* * * * *